(12) United States Patent
Juma et al.

(10) Patent No.: US 11,598,521 B2
(45) Date of Patent: Mar. 7, 2023

(54) METHOD AND DEVICE FOR AUTOMATICALLY ADAPTING A FLAME TO VARIABLE OPERATING CONDITIONS

(71) Applicant: L'Air Liquide, Societe Anonyme pour l'Etude et l'Exploitation des Procedes Georges Claude, Paris (FR)

(72) Inventors: Sarah Juma, Les Loges-en-Josas (FR); Chloe Caumont-Prim, Les Loges-en-Josas (FR); Xavier Paubel, Les Loges-en-Josas (FR); Jean-Baptiste Senechal, Les Loges-en-Josas (FR); Benoit Grand, Les Loges-en-Josas (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 135 days.

(21) Appl. No.: 16/831,087

(22) Filed: Mar. 26, 2020

(65) Prior Publication Data

US 2020/0309366 A1 Oct. 1, 2020

(30) Foreign Application Priority Data

Mar. 26, 2019 (EP) ..................... 19305378

(51) Int. Cl.
*F23D 14/64* (2006.01)
*F23C 5/08* (2006.01)
(Continued)

(52) U.S. Cl.
CPC ................ *F23D 14/64* (2013.01); *F23C 5/08* (2013.01); *F23D 14/32* (2013.01); *F23L 7/007* (2013.01)

(58) Field of Classification Search
CPC . F23L 2900/07006; F23L 7/007; F23D 14/64; F23D 14/32; F23D 14/22;
(Continued)

(56) References Cited

U.S. PATENT DOCUMENTS 5,049,063 A * 9/1991 Kishida .................. F23N 5/123
431/63
5,249,954 A * 10/1993 Allen ...................... F23N 5/082
431/14
(Continued)

FOREIGN PATENT DOCUMENTS

CA 2221331 A1 * 5/1998
EP 0710798 A2 * 5/1996
(Continued)

OTHER PUBLICATIONS

EP Search Report and Written Opinion for EP 19305378, dated Sep. 10, 2019. (Machine Translation).

*Primary Examiner* — Jorge A Pereiro
(74) *Attorney, Agent, or Firm* — Christopher J. Cronin (57) ABSTRACT

Process for combusting a fuel with an oxidant and burner for the implementation thereof, process wherein at least one stream of the fuel is injected through at least one first perforation, a main flow of oxidant is injected below or above the one or more streams of the fuel through at least one second perforation, an auxiliary flow of the oxidant is introduced into contact with the at least one fuel stream so as to generate an initial flame by an initial partial combustion of the fuel with the auxiliary flow of the oxidant, this initial partial combustion being completed downstream of the initial flame by means of the at least one main stream of the oxidant, the flow rate of the main flow of the oxidant or the ratio between the flow rate of the main flow of the oxidant and the flow rate of the auxiliary flow of the oxidant being (Continued)

adjusted depending on the emission intensity of the initial flame.

19 Claims, 3 Drawing Sheets

(51) Int. Cl.
*F23D 14/32* (2006.01)
*F23L 7/00* (2006.01)

(58) Field of Classification Search
CPC . F23D 14/20; F23C 5/08; F23M 2900/05021; F23N 5/08; F23N 5/082; F27D 2019/0034
See application file for complete search history.

(56) References Cited

U.S. PATENT DOCUMENTS

| | | | | |
|---|---|---|---|---|
| 5,439,373 A * | 8/1995 | Anderson | ............... | F23D 14/04 431/190 |
| 5,611,682 A * | 3/1997 | Slavejkov | ............ | C03B 5/2353 431/353 |
| 5,833,447 A * | 11/1998 | Bodelin | ................. | F23D 14/22 431/174 |
| 5,975,886 A * | 11/1999 | Philippe | ................. | F23D 14/32 431/165 |
| 5,984,667 A * | 11/1999 | Philippe | ................. | F23D 14/22 431/165 |
| 6,126,438 A * | 10/2000 | Joshi | ...................... | F23C 7/002 431/161 |
| 6,659,762 B2 * | 12/2003 | Borders | ................. | F23D 14/32 431/351 |
| 6,910,879 B2 * | 6/2005 | Dugue | .................... | F23C 7/02 431/190 |
| 7,780,436 B2 * | 8/2010 | Soupos | .................... | F27B 3/28 431/351 |
| 8,454,354 B2 * | 6/2013 | Watson | ................. | C03B 5/2353 431/284 |
| 9,360,257 B2 * | 6/2016 | Sane | .......................... | F23N 1/02 |
| 9,568,194 B2 * | 2/2017 | Amirat | .................... | F23N 1/007 |
| 2001/0023053 A1 * | 9/2001 | Hoke, Jr. | ................ | F23D 14/32 431/12 |
| 2003/0054308 A1 * | 3/2003 | Abbasi | .................... | F23C 7/008 431/89 |
| 2003/0157450 A1 * | 8/2003 | Joshi | ...................... | F23D 14/66 431/161 |
| 2007/0248923 A1 * | 10/2007 | Rangmark | ............. | F23D 14/32 431/350 |
| 2010/0086886 A1 * | 4/2010 | Johnson | ................. | F23N 5/102 431/72 |
| 2010/0183990 A1 * | 7/2010 | Watson | .................... | F23C 1/08 431/181 |
| 2011/0146450 A1 * | 6/2011 | Docquier | ................ | F23D 14/32 431/12 |
| 2015/0267915 A1 * | 9/2015 | Goruney | ............... | F23D 14/583 431/353 |
| 2016/0025334 A1 * | 1/2016 | Taylor | ...................... | F23L 5/02 431/350 |
| 2016/0334271 A1 * | 11/2016 | Zabel | ...................... | G01J 1/429 |
| 2016/0334453 A1 * | 11/2016 | Zabel | ...................... | G01R 31/50 |
| 2016/0348904 A1 * | 12/2016 | Gangoli | .............. | F27D 99/0033 |
| 2018/0237323 A1 * | 8/2018 | D'Agostini | ............. | F23D 14/56 |

FOREIGN PATENT DOCUMENTS

| | | |
|---|---|---|
| EP | 0 763 692 | 3/1997 |
| EP | 0 844 433 | 5/1998 |
| EP | 3 098 512 | 11/2016 |
| EP | 3 671 038 | 6/2020 |
| WO | WO 2013/097165 | 7/2013 |

* cited by examiner

METHOD AND DEVICE FOR AUTOMATICALLY ADAPTING A FLAME TO VARIABLE OPERATING CONDITIONS

CROSS-REFERENCE TO RELATED APPLICATIONS

This application claims the benefit of priority under 35 U.S.C. § 119 (a) and (b) to EP patent application No. EP19305378, filed Mar. 26, 2019, the entire contents of which are incorporated herein by reference.

BACKGROUND

Field of the Invention

The present invention relates to a process for combusting by means of a burner, to a burner suitable for the implementation thereof in such a process and to an installation comprising such burners.

In industrial combustion processes, for example in order to convert a feedstock, the effectiveness of the transfer of heat from the flame and from the combustion products to the feedstock is of essential importance. The transfer of heat by convection and the transfer of heat by radiation are in particular distinguished between.

As a general rule, the emission intensity of a flame is indicative of the portion of the energy generated by the combustion that is transferred by radiation. The spectral interval of the emission and the emission intensity in this interval is related to the presence of combustion products and of excited radicals (intermediate species), such as hydroxyl radicals, that relax by emitting in specific wavelength ranges or at specific wavelengths. The nature and amount of said excited radicals depends in turn on parameters such as the nature of the fuels and oxidant and on their respective flow rates and the ratio of their flow rates and on the oxidizing or reducing state of this flame.

Related Art

These relationships are already known from patent application EP-A-0763692 in which a burner is described that comprises an interior first passage for supplying oxygen-rich oxidant (at least 80% $O_2$), an intermediate passage for supplying fuel externally encircling the first passage for supplying oxidant and an exterior second passage for supplying oxidant externally encircling the passage for supplying fuel. According to EP-A-0763692, the burner comprises a means for making the flow rate of oxidant injected through the interior first passage vary, this allowing a characteristic of the flame such as luminosity and flame length to be controlled, and in particular control of the emission of the OH radical (also denoted OH*). The aforementioned known burner is a burner with concentric and adjacent injection of fuel and oxidant that generates a flame of essentially circular cross-section and therefore essentially axisymmetric heat transfer.

Although, for certain applications, such an axisymmetric transfer is desired, for other applications, a non-axisymmetric heat transfer is preferable.

For example, in a so-called "tank" glass-melting furnace comprising burners mounted in the vertical walls above the feedstock, it is sought to maximize the transfer of heat to the feedstock located below the level of the burners and to minimize the transfer of heat to the walls and ceiling of the furnace. This is in particular achieved by means of burners positioned in the vertical walls and in proximity to the feedstock to be heated and that generate so-called "flat flames", substantially parallel to the free surface of the feedstock.

In addition to an optimized heat transfer, it is sought, in particular in processes in which the flame interacts directly with the feedstock (without physical barrier between the flame and the feedstock), certain flame characteristics in order to avoid, as much as possible, damage and/or losses generated by the combustion. These sought-after flame characteristics include a certain flame shape and/or length and the redox characteristics of the flame.

Specifically, an oxidizing flame is liable to interact with the feedstock and to oxidize it, this being to be avoided in the context of melting non-ferrous metals for example. In the context of melting glass, the oxidizing/reducing effect of the flame may influence the redox state of the glass or the formation of foam, with an impact on product losses and the characteristics of the end product, such as the colour of the glass, or indeed on the power consumption of the furnace. It will also be noted that a reducing flame is liable to produce soot and other unburnt materials, having an effect on the heat transfer and the emission of pollutants in the burnt gases generated by the combustion.

The overall oxidant/fuel ratio of a burner is generally determined by the amount of oxidant required to ensure complete combustion of the injected fuel (or, in the case where a partial combustion of the fuel is sought, the amount of oxidant required to achieve the sought-after degree of combustion).

In order for the flame to nevertheless have an oxidizing/reducing effect on the feedstock, it is known to generate what is referred to as a "staggered" flame by injecting at least some of the oxidant at a distance from the injection of the fuel, or even by injecting at least some of the fuel at a distance from the injection of the oxidant, so that said flame has an oxidizing zone on the side of the feedstock and a reducing zone on the other side or vice versa.

Thus, EP-A-0844433 describes a process for combusting a fuel with an oxidant in a combustion chamber by means of a burner, process wherein:
  fuel is injected into the combustion chamber in the form of at least two adjacent streams;
  the majority of the oxidant is injected into the combustion chamber above said at least two fuel streams through at least one elongate aperture of the burner so that said majority of the oxidant encounters the fuel streams in the combustion chamber downstream of the burner,
  the rest of the oxidant is injected into the combustion chamber around the least two fuel streams so as to produce a fuel-rich initial combustion (initial flame) in proximity to the burner and before the majority of the oxidant encounters the fuel streams.

In this way, it is possible to generate a reducing initial flame in proximity to the feedstock located below the initial flame while nonetheless achieving complete combustion of the fuel.

SUMMARY OF THE INVENTION

One aim of the present invention is to allow the oxidizing or reducing effect of the initial flame on the feedstock to be adjusted, in particular in the case of a flat flame with staggered injection of the oxidant. Another aim of the present invention is to allow such an adjustment to be carried out in real-time. Another aim of the present invention is to allow such an adjustment of the oxidizing or reducing effect of a flame to be carried out reliably with an adjustment loop.

THE PROCESS ACCORDING TO THE INVENTION

To this end, the present invention provides a process for combusting, by means of a burner, a fuel with an oxidant, said combustion taking place in a combustion zone located downstream of the burner, for example inside a furnace such as a melting furnace, in particular a glass-melting furnace, a reheat furnace, a recycling furnace, etc.

According to the invention, the burner comprises a block with an entrance face, and an exit face located opposite the entrance face. The entrance face is located opposite the combustion zone, the exit face being located on the same side as the combustion zone.

The block of the burner is typically made of refractory material and allows the burner to be mounted in a wall of the furnace.

The block of the burner comprises at least one first perforation that extends from the entrance face to the exit face. Said at least one first perforation ends at a first level in the exit face of the block.

The block of the burner comprises at least one second perforation that also extends from the entrance face to the exit face. This at least one second perforation ends in the exit face of the block at a second level spaced apart from the first level, the second level being located below or above the first level.

At least one fuel injector is positioned in the at least one first perforation. At least one oxidant injector, called the 'main oxidant injector', is positioned in the at least one second perforation.

In the process according to the invention, at least one stream of the fuel is injected into the combustion zone through the at least one fuel injector and the at least one corresponding first perforation.

A first oxidant flow, called the 'main oxidant flow', is introduced into the combustion zone in at least one main stream of oxidant. This at least one main stream of oxidant is injected into the combustion zone through the at least one main oxidant injector and the at least one corresponding second perforation, this at least one main stream of oxidant being thus injected into the combustion zone below or above the at least one stream of the fuel depending on the position of the second perforation with respect to the at least one first perforation.

A second oxidant flow, called the 'auxiliary oxidant flow', is introduced in the combustion zone into contact with the at least one fuel stream. The auxiliary flow of the oxidant is preferably introduced into the combustion zone through the at least one first perforation, and in particular around the one or more fuel injectors located in the one or more first perforations of the block.

An initial flame is generated in the combustion zone by initial partial combustion of the fuel with this auxiliary flow of the oxidant. Since the combustion of the fuel in the initial flame is a partial combustion, only some of the fuel is consumed (burnt) in the initial flame.

Downstream of the initial flame, the oxidant of the at least one main stream of the oxidant mixes with fuel that was not consumed by the partial combustion in the initial flame. In this way, the combustion of the injected fuel is completed downstream of the initial flame with the oxidant of the at least one main stream.

Thus a staggered combustion of said fuel is obtained.

According to the present invention, the emitted intensity, also called the emission intensity, of the initial flame is measured and the flow rate of the main flow of the fuel or the ratio between the flow rate of the main flow of the fuel and the flow rate of the auxiliary flow of the fuel is adjusted depending on the measured emission intensity.

According to one preferred embodiment of the invention, the emitted intensity and also the oscillation frequency of the initial flame are measured and the flow rate of the main flow of the fuel or the ratio between the flow rate of the main flow of the fuel and the flow rate of the auxiliary flow of the fuel is adjusted depending on the measured emission intensity and the measured oscillation frequency.

The fuel used in the process according to the invention is generally a gaseous fuel, such as a fuel chosen from natural gas, biogas, propane, butane, the residual gases of steelmaking or methane-reforming processes, hydrogen or any mixture of at least two of these gaseous fuels.

The oxidant generally has an oxygen content of 21 to 100 vol %, preferably of at least 80 vol %, or even more preferably of at least 90 vol %.

The emitted intensity of a flame reflects certain important characteristics of a flame. The emitted intensity may in particular be related to the redox state of the flame and to the nature and concentration of the excited radicals present in the flame and that are the emitters of the characteristic emitted spectrum of the flame.

Thus, when the emitted intensity, and where appropriate also the oscillation frequency (or even a value dependent on these two parameters), of the sought-after initial flame are known, detection of the emitted intensity, and optionally also of the oscillation frequency of the initial flame, makes it possible to verify whether the obtained initial flame has the properties of the sought-after initial flame, no matter whether it be for a sought-after flame having constant characteristics, or even for a sought-after flame having characteristics that vary over time (see below).

By measuring, in the case of a staggered combustion such as described above, the emission intensity and, where appropriate, also the oscillation frequency, of the initial flame, the present invention allows this initial flame to be characterized and whether it corresponds to the sought-after flame to be verified. If such is not the case, the invention allows the flame to be corrected by regulating the oxidant injection.

Thus, according to the present invention, the flow rate of the main flow of the oxidant or the ratio between the flow rate of the main flow of the oxidant and the flow rate of the auxiliary flow of the oxidant is adjusted depending on the measured emission intensity and optionally also the measured oscillation frequency.

As indicated above, the ratio between the fuel flow rate and the overall oxidant flow rate (flow rate of main oxidant and of auxiliary oxidant) injected through the burner is determined by the required degree of combustion of the fuel: complete or partial combustion.

By adjusting/regulating, according to the present invention, the flow rate of the main flow of the oxidant or the ratio between the flow rate of the main flow of the oxidant and the flow rate of the auxiliary flow of the oxidant, certain properties of the initial flame, in particular the oxidizing/reducing state of the initial flame, are adjusted via the regulation of the flow rate of the auxiliary flow of oxidant.

The oxidizing/reducing effect of the initial flame depends on the auxiliary oxidant/fuel ratio in the initial flame and, for a given auxiliary oxidant/fuel ratio, on the nature of the fuel (gaseous/liquid/solid fuel, composition, calorific value, presence of moisture, etc.).

By measuring, according to the present invention, the emission intensity and, where appropriate, also the oscillation frequency, of the initial flame, it is possible to adjust the oxidizing/reducing effect of the initial flame in real-time, for example when the one or more valves that are used to adjust the flow rate of fuel to the burner do not generally allow an exact value to be ensured for the flow rate of oxidant delivered to the initial flame. The present invention also allows the oxidizing/reducing effect of the initial flame to be adjusted in real-time independently of the nature of the fuel and even in the case of a fuel of variable composition.

When a feedstock to be heated is located on one side of the initial flame (typically below the initial flame) and the main oxidant is injected on the opposite side of the initial flame with respect to the feedstock, the present invention allows the reducing effect of the initial flame on the feedstock to be adjusted.

Furthermore, when the main oxidant is injected between the initial flame and a feedstock to be heated, the present invention allows, by adjustment of the flow rate of the main flow of the oxidant, the oxidizing effects of the main flow of oxidant and therefore of the flame on the feedstock to be adjusted.

Thus, the present invention provides a solution for feedstocks that are particularly susceptible to such an oxidizing/reducing effect, such as glass, a difference between the sought-after oxidizing/reducing effect and the observed oxidizing/reducing effect possibly having a substantial impact on the quality of the product obtained with such feedstocks.

It will also be noted that, when a furnace comprises a plurality of burners, a different adjustment may be used for various burners, for example, in a melting/fining furnace, for the burners in the melting zone and for the burners in the fining zone.

The Block, the Perforations and the Injectors

The block of the burner may vary significantly depending on the sought-after furnace, on the sought-after flame and on the sought-after effect.

The block of the burner may thus comprise a single first perforation through which the fuel is injected and/or a single second perforation through which the main oxidant is injected. Said at least one first perforation ends at a first level in the exit face of the block.

The block may also comprise a plurality of first perforations and/or a plurality of second perforations.

The block may thus comprise:
a single first perforation and a single second perforation,
a single first perforation and a plurality of second perforations,
a plurality of first perforations and a single second perforation, or even
a plurality of first perforations and a plurality of second perforations.

When the block comprises a plurality of second perforations through which the main oxidant is injected, it is recommended to distinguish between:
blocks the second perforations of which all end in the exit face at a level located above the first level at which the at least one first perforation ends in the exit face,
blocks the second perforations of which all end in the exit face at a level located below the first level,
blocks at least one second perforation of which ends in the exit face at a level located below the first level and at least one second perforation of which ends in the exit face at a level located above the first level (the block according to this latter embodiment may also be described as having at least one second perforation that ends in the exit face at a level located above the first level and having at least one third perforation that ends in the exit face at a level located below the first level, see below).

Each embodiment has its own advantages, in particular as regards the manufacturer of the burner, its flexibility and the properties, including the shape, of the obtained flame, and the embodiment used is selected depending on the application targeted for the process according to the invention.

Specifically, as mentioned above, when all of the main oxidant is injected into the combustion zone through one or more second perforations that end in the exit face at a level above the first level of the one or more first perforations, a feedstock below the flame may be reduced by the initial flame.

When all of the main oxidant is injected into the combustion zone through one or more second perforations that end in the exit face at a level below the first level of the one or more first perforations, a feedstock below the flame may be oxidized by the main oxidant thus injected.

A burner the block of which has at least one perforation that ends in the exit face at a level located below the first level and at least one second perforation that ends in the exit face at a level located above the first level allows both forms of operation, and a variable distribution of the main oxidant between the at least one second perforation above the first level and the at least one second perforation below the first level, for example depending on the nature of the feedstock, or even depending on the stage of advance of the process (melting process for example) taking place in the furnace.

A first perforation may accommodate a single fuel injector or a plurality of fuel injectors. Analogously, a second perforation may accommodate a single main oxidant injector or a plurality of main oxidant injectors.

Thus, in the burner:
at least one, or even each, first perforation may accommodate a single fuel injector and/or
at least one, or even each, second perforation may accommodate a single main oxidant injector.
In the burner:
at least one, or even each, first perforation may accommodate a plurality of fuel injectors and/or
at least one, or even each, second perforation may accommodate a plurality of main oxidant injectors,
or indeed:
at least one first perforation may accommodate a single fuel injector whilst at least one other first perforation accommodates a plurality of fuel injectors and/or
at least one second perforation accommodates a single main oxidant injector whilst at least one other second perforation accommodates a plurality of main oxidant injectors.

Thus, according to one particular embodiment, the burner comprises at least two main oxidant injectors positioned in the at least one second perforation of the block and the main flow of oxidant is introduced in the combustion zone into at least two main streams of the oxidant, which are injected into the combustion zone from below or above the one or more streams of the fuel, said at least two main streams of the oxidant being injected through said at least two injectors of the main oxidant and said at least one second perforation.

The burner may thus comprise at least two fuel injectors positioned in the at least one first perforation of the block, at least two streams of the fuel being injected into the combustion zone through said at least two fuel injectors and the at least one first perforation.

According to one embodiment, at least one first perforation of the block has a circular cross section and/or at least one second perforation of the block has a circular cross section. Such (first or second) perforations of substantially circular cross section are particularly useful for accommodating a single (fuel or main oxidant, respectively) injector and in particular a single injector that itself has a (substantially) circular cross section.

According to another embodiment, at least one first perforation of the block has a horizontally elongate cross section and/or at least one second perforation of the block has a horizontally elongate cross section. Such (first or second) perforations of horizontally elongate cross section are particularly useful for accommodating a plurality of injectors, in particular at least two injectors positioned beside each other (for example in parallel or like a fan). Such (first or second) perforations of horizontally elongate cross section are also useful for accommodating an injector that is also of horizontally elongate cross section. In both cases, such a perforation of horizontally elongate cross section allows a planar and/or fan-shaped flow of the corresponding fluid to be injected into the combustion zone.

As already indicated above, at least one of the first perforations, i.e. one or more, or even each, first perforation of the block, may accommodate a single fuel injector. Analogously, at least one of the second perforations, i.e. one or more, or even each, second perforation of the block, may accommodate a single main oxidant injector.

According to one advantageous embodiment, the burner comprises at least two fuel injectors, which are therefore positioned in the at least one first perforation of the block, and/or at least two main oxidant injectors, which are positioned in the at least one second perforation of the block. Preferably, the burner comprises at least two fuel injectors positioned in the at least one first perforation and at least two main oxidant injectors positioned in the at least one second perforation. The number of fuel injectors may be equal to or different from the number of oxidant injectors.

As already indicated above, at least one, i.e. one or more, or even each, first perforation of the block, may accommodate a plurality of (2) fuel injectors. Analogously, one or more, or even each second perforation of the block may accommodate a plurality of main oxidant injectors.

When the burner comprises a plurality (2) of main oxidant injectors, the block of the burner may have a plurality (2) of second perforations, each accommodating a single main oxidant injector. Analogously, when the burner comprises a plurality (2) of fuel injectors, the block of the burner may have a plurality (2) of first perforations, each accommodating a single fuel injector. According to one particular embodiment, each first and second perforation of the block accommodates a single injector.

According to one particularly adaptable embodiment of the process according to the invention, the second level, i.e. the level at which the at least one second perforation ends in the exit face of the block is located above the first level, i.e. above the level at which the at least one first perforation ends in the exit face of the block, the block also comprising at least one (i.e. one or more) third perforation that ends in the exit face of the block at a third level located below the first level. At least one additional main oxidant injector is positioned in the at least one third perforation.

It will be noted that the block of the burner may also comprise one or more perforations other than the first and second perforations, for example serving as passage for a sensor (for example a sensor of emission intensity and/or of oscillation frequency, a sensor of flame presence, a temperature sensor, etc.).

Measurement of the Emission Intensity of the Flame/of the Oscillation Frequency

In the process according to the invention, the emitted intensity and optionally also the oscillation frequency of the initial flame is measured in a preset spectral interval, the flow rate of the main flow of the oxidant or the ratio between the flow rate of the main flow of the oxidant and the flow rate of the auxiliary flow of the oxidant being adjusted depending on the measured emission intensity and optionally the measured oscillation frequency.

The emission intensity, and optionally the oscillation frequency of the initial flame, is typically measured by means of a sensor directed toward the initial flame, or even a plurality of such sensors.

This sensor directed toward the initial flame through a perforation of the block may be mounted on the burner itself or in another suitable place in the furnace, for example in proximity to the burner in the furnace's wall in which the burner is mounted, or in another wall or in the ceiling of the furnace.

The emission intensity of the initial flame is usefully measured in an interval located in the range from 190 to 520 nm, and preferably in the range from 280 to 410 nm. A suitable sensor will be used to this end. Thus, a sensor of the emitted intensity that, in an interval between 300 and 315 nm has a sensitivity of at least 30% of its maximum sensitivity, will advantageously be used. The objective is to measure the emission intensity at the emission wavelength of the OH* radical, which is centred on 307 nm+/−5 nm.

The oscillation frequency of the initial flame may be measured by means of the sensor that also measures emission intensity, or by means of another sensor.

Adjustment

Various forms of adjustment of the flow rate of the main flow of the oxidant or of the ratio between the flow rate of the main flow of the oxidant and the flow rate of the auxiliary flow of the oxidant are possible.

The flow rate of the main flow of the oxidant or the ratio between the flow rate of the main flow of the oxidant and the flow rate of the auxiliary flow of the oxidant are advantageously adjusted so that the emission intensity of the initial flame is located in a preset zone or range of emission intensity. When the emission intensity and the oscillation frequency of the initial flame are measured, the flow rate of the main flow of the oxidant or the ratio between the flow rate of the main flow of the oxidant and the flow rate of the auxiliary flow of the oxidant are advantageously adjusted so that the emission intensity of the initial flame is located in a preset zone or range of emission intensity and optionally so that the oscillation frequency and/or the emission intensity of the initial flame is located in a preset frequency range, or even so that the product of the emission intensity and of the oscillation frequency of the initial flame is located in a preset range.

It will be noted that the aforementioned preset ranges may be constant or may vary over time, for example depending on the nature of the feedstock to be processed in the furnace or depending on the stage of the advance of the process (melting process for example) taking place in the furnace.

According to one particular embodiment, the flow rate of the main flow of the oxidant or the ratio between the flow rate of the main flow of the oxidant and the flow rate of the auxiliary flow of the oxidant is adjusted so that the emission intensity of the primary flame corresponds to a preset value of emission intensity. When the emission intensity and the oscillation frequency of the initial flame are measured, the flow rate of the main flow of the oxidant or the ratio between the flow rate of the main flow of the oxidant and the flow rate of the auxiliary flow of the oxidant are advantageously adjusted so that the emission intensity of the primary flame corresponds to a preset value of emission intensity, optionally so that the oscillation frequency of the initial flame corresponds to a preset value of oscillation frequency, or even so that the product of the emission intensity and of the oscillation frequency of emission of the initial flame corresponds to a preset value.

Given that any detection of a parameter is subject to a margin of error, a given value will be considered, in the present context, to correspond to a preset value when this first value is located within the margin of error about the preset value.

It is also possible to use a preset range as reference for one of the emitted intensity and of the oscillation frequency and to use a preset value as reference for the other of the emitted intensity and of the oscillation frequency.

These preset ranges or values, which typically correspond to an initial flame with sought-after characteristics or to a sought-after (oxidizing/reducing) effect of the flame on a feedstock, may be set beforehand based on prior experiments with such a staggered combustion in the furnace, in particular as regards the effect on the feedstock, by means of tests or even based on correlations already known for the fuel and oxidant used.

As already indicated above with respect to the preset ranges, the aforementioned preset values may be constant or may vary over time, for example depending on the nature of the feedstock to be processed in the furnace or depending on the stage of the advance of the process taking place in the furnace.

To adjust the flow rate of the main flow of the oxidant or of the ratio between the flow rate of the main flow of the oxidant and the flow rate of the auxiliary flow of the oxidant, the measured emission intensity and, where appropriate also the measured oscillation frequency, is transmitted to a control system. The control system may be an analogue or digital control system and preferably is a digital control system. The control system is connected to an adjusting system that adjusts the flow rate of the main flow of the oxidant, or that even adjusts the ratio between the flow rate of the main flow of the oxidant and the flow rate of the auxiliary flow of the oxidant, for example by means of one or more adjusting valves. The control system controls the adjusting system so that the latter adjusts the flow rate of the main flow of the oxidant, or even the ratio between the flow rate of the main flow of the oxidant and the flow rate of the auxiliary flow of the oxidant, depending on the measured emission intensity and, where appropriate, also depending on the measured oscillation frequency. According to one particular embodiment, the control system controls the adjusting system so that the adjusting system adjusts the flow rate of the main flow of the oxidant, or even the ratio between the flow rate of the main flow of the oxidant and the flow rate of the auxiliary flow of the oxidant, depending on the product of measured emission intensity and of the measured oscillation frequency.

The transmission of measured data to the control system, the communication between the control system and the adjusting system and the communication between the adjusting system and the equipment allowing the flow of the fluids through the burner to be varied may be achieved by any known means, for example analogically or digitally. A wireless communication is generally preferred.

In the case of an embodiment in which the at least one second perforation ends in the exit face of the block at a second level located above the first level (level at which the at least one first perforation ends in the exit face) and the block also comprises at least one third perforation in which at least one additional main oxidant injector is positioned and which ends in the exit face at a third level located below the first level, it is advantageous to adjust not only
   the flow rate of the main flow of the oxidant or the ratio between the flow rate of the main flow of the oxidant and the flow rate of the auxiliary flow of the oxidant,
but also,
   the distribution of the main oxidant between
      the at least one main oxidant injector in the at least one second perforation and
      the at least one additional main oxidant injector in the at least one third perforation
depending on the measured emission intensity, or even depending on the measured emission intensity and the measured oscillation frequency. As already indicated above, this adjustment may in particular be carried out depending on the product of the measured emission intensity and of the measured oscillation frequency.

This embodiment allows, in the case of a feedstock located below the initial flame:
   the feedstock to be reduced by injecting all of the main oxidant above the initial flame through the at least one second perforation,
   the feedstock to be oxidized by injecting all of the main oxidant between the initial flame and the feedstock through the at least one third perforation, and
   the oxidizing/reducing effect on the feedstock to be mitigated or adjusted by adjusting the distribution of the injection of the main oxidant between the injection above the initial flame through the at least one second perforation and the injection below the initial flame through the at least one third perforation.

Variants

There are many variants of the process according to the present invention.

According to one particularly advantageous variant of the method according to the invention, the at least one injector of the fuel is present in the form of a pair of (a) a primary injector of the fuel with (b) a secondary injector of the fuel. In this pair, one of the primary injector and secondary injector encircles the other of the primary injector and secondary injector.

According to this embodiment, on the one hand the flow rate of the fuel flow delivered to the primary injector of the pair is adjusted, and on the other hand the flow rate of the fuel flow delivered to the secondary injector of the pair is adjusted.

In one such embodiment, the burner preferably comprises an assembly for injecting the fuel with:
   a chamber having an inlet through which the fuel is introduced into the assembly and the one or more pairs forming the at least one injector of the fuel, which are fluidically connected to the chamber,
   a pressure sensor for detecting a gas pressure in the chamber,
   an adjusting system for adjusting the distribution of the fuel between the primary injector and secondary injector of each fuel injector/pair, the control system being connected to the pressure sensor and to the adjusting system, said control system controlling the adjusting system so that the distribution of the fuel between the primary injector and secondary injector of each fuel injector/pair is adjusted depending on the gas pressure detected by the pressure sensor.

More information on a burner with such an assembly for injecting the fuel, the operation thereof and the advantages thereof may be found in the coexisting European patent application 18306820.4 filed 21 Dec. 2018.

Burner According to the Invention

The present invention also relates to a burner suitable for implementing any one of the embodiments of the method according to the invention.

Such a burner comprises a block and a device for supplying fluids.

The block has an entrance face and an exit face opposite the entrance face. The block also has:
- at least one first perforation (one or more first perforations) that extends from the entrance face to the exit face and that ends at a first level in the exit face of the block, and
- at least one second perforation (one or more second perforations) that extends from the entrance face to the exit face and that ends in the exit face at a second level, this second level being spaced apart from the first level and being located below or above the first level.

The device for supplying the burner according to the invention comprises:
- at least one fuel injector positioned in the at least one first perforation of the block, and
- at least one main oxidant injector positioned in the at least one second perforation of the block.

The supplying device also comprises at least one auxiliary oxidant feed (input) that is fluidically connected to the at least one first perforation. This fluidic connection may be achieved by virtue of a mechanical distributing system that is integrated into the metal portions of the burner, attached to the entrance face and at least partially inserted into the block.

The at least one fuel injector and the at least one first perforation are arranged so that a fuel injected through the exit face of the block by means of the at least one fuel injector and of the at least one first perforation forms at least one stream of the fuel lying in a first plane.

Analogously, the at least one main oxidant injector and the at least one second perforation are arranged so that a main oxidant injected through the exit face of the block by means of the at least one main oxidant injector and of the at least one second perforation forms at least one stream of the oxidant lying in a second plane.

According to one embodiment, the first and second planes intersect at an intersection line L located at a distance downstream of the exit face. When the burner is used in the process according to the invention, the main oxidant will thus make contact with the fraction of the fuel that was not consumed in the initial flame at about this distance L in order to generate the final combustion of said fuel.

According to another embodiment, the first and second planes are parallel. In this case, the main oxidant will also make contact with the fraction of the fuel that was not consumed in the initial flame at a relatively large distance downstream of the burner because of the development (they tend to flare out) of the respective streams in the combustion zone.

The burner according to the invention also comprises a sensor of emission intensity and optionally also a sensor of oscillation frequency, the sensor of emission intensity and the sensor of oscillation frequency possibly being integrated into one and the same sensor.

Such sensors are available on the market, examples thereof being flame controllers, which are also sometimes sold as "UV/IR cells" or "flame detectors" by suppliers such as Durag (references DLX-101/DLX-100 or DLX-201/DLX-200 for example) or Honeywell (for example reference U2-1010S-PF) or Hamamatsu (for example a UV C9536/H9958 sensor), or UV or IR spectrometers (for example the Oceanoptics FLAME-S or FLAME-T series, or STS-UV-L25-400-SMA or equivalent from other suppliers) or (ICCD, CCD, RGB) cameras (for example a camera supplied by Princeton Instruments: PI max 4 ICCD), all these devices being able to be coupled to optical filters (for example XHQA310 or XHQA300 Asahi filters).

The sensor of the emission intensity is directed toward the first plane along a line of sight. This line of sight intersects the first plane in front of the at least one first perforation of the block and at a distance d from the exit face of the block such that the ratio d/h=1 to 10, h being the vertical distance between the first level and the second level.

Analogously, when a sensor of oscillation frequency is present, the sensor of oscillation frequency is directed along a line of sight toward the first plane, this line of sight of said sensor intersecting the first plane in front of the at least one first perforation and at a distance d from the exit face such that the ratio d/h=1 to 10.

To ensure a more reliable measurement of the emission intensity and, where appropriate, of the oscillation frequency, the burner may be equipped with at least two corresponding sensors.

The burner according to the invention comprises an adjusting system that is able to adjust:
- a flow rate of a flow of fuel that is delivered to at least one fuel injector,
- a flow rate of a flow of oxidant, called the 'main flow of the oxidant', which is delivered to the at least one main oxidant injector, and
- a flow rate of a flow of oxidant, called the 'auxiliary flow of the oxidant', which is delivered to the auxiliary oxidant feed.

The burner according to the invention also comprises a control system that is connected to the sensor of emission intensity (and where appropriate also to the sensor of oscillation frequency) and to the adjusting system.

The control system is able, and in particular programmed, to control the adjusting system of the burner so that, when the burner is used in the process according to the invention, the flow rate of the main flow of the oxidant or the ratio between the flow rate of the main flow of the oxidant and the flow rate of the auxiliary flow of the oxidant is adjusted depending on the emission intensity measured by the sensor of emission intensity, and where appropriate also depending on the oscillation frequency measured by the sensor of oscillation frequency.

Various optional features and embodiments of the burner according to the invention are described above in the context of the description of the various embodiments of the method according to the invention.

Thus, the control system of the burner according to the mention may be able, and in particular programmed, to control the adjusting system so that the adjusting system adjusts/regulates the flow rate of the main flow of the oxidant or the ratio between the flow rate of the main flow of the oxidant and the flow rate of the auxiliary flow of the oxidant so that the emission intensity measured by the sensor of the emission intensity is located in a preset zone or range of emission intensity and optionally also so that the oscillation frequency measured by the sensor of oscillation frequency is located in a preset zone or range of oscillation frequency.

According to other embodiments, the control system of the burner adjusts the flow rate of the main flow of the oxidant or the ratio between the flow rate of the main flow of the oxidant and the flow rate of the auxiliary flow of the oxidant so that:

the product of the measured emission intensity and the measured oscillation frequency is located in a preset range, or the measured emission intensity corresponds to a preset value of emission intensity, and optionally also so that the measured oscillation frequency corresponds to a preset value of oscillation frequency, or the product of the measured emission intensity and the measured oscillation frequency corresponds to a preset value.

According to one particular embodiment of the burner, according to the invention, the at least one injector of the fuel is a pair of a primary injector of the fuel with a secondary injector of the fuel, in which pair one of the primary injector and secondary injector encircles the other of the primary injector and secondary injector.

Such a burner advantageously has an assembly for injecting the fuel that comprises a chamber with an inlet through which the fuel is introduced into the assembly, the at least one pair forming the at least one injector of the fuel being fluidically connected to this chamber.

This burner is also advantageously equipped with a pressure sensor for detecting a gas pressure in the chamber.

It also comprises an adjusting system for adjusting the distribution of the fuel between the primary injector and the secondary injector of each pair. This control system is connected to the pressure sensor and to the regulating system. The control system is able, and in particular programmed, to control the adjusting system so that, when the burner is used in the process according to the invention, the adjusting system adjusts the distribution of the fuel between the primary injector and the secondary injector of each pair depending on the gas pressure detected by the pressure sensor of the assembly.

Such a control system may be integrated into an adjusting loop, in order to adjust the distribution of the fuel between the primary injector and the secondary injector of each pair on the basis of a measurement of the pressure of the gaseous fuel in the chamber before its distribution between the one or more primary injectors and the one or more secondary injectors.

As already indicated above, such burners are in particular described in the coexisting European patent application 18306820.4 filed 21 Dec. 2018. According to one specific embodiment, the block has:

at least one second perforation that ends in the exit face at a second level located above the first level, and at least one third perforation that ends in the exit face at a third level located below the first level.

At least one oxidant injector, and preferably at least two such oxidant injectors, is/are positioned in the at least one second perforation of the block, and at least one oxidant injector, and preferably at least two such injectors, is/are positioned in the at least one third perforation of the block.

In this case, the adjusting system is able and in particular programmed:

to adjust the flow rate of the main flow of the oxidant or to adjust the ratio between the flow rate of the main flow of the oxidant and the flow rate of the auxiliary flow of the oxidant, and to adjust the distribution of the oxidant between the at least one injector of the fuel in the at least one second perforation and the at least one injector of the fuel in the at least one third perforation and to do so under the control of the control system and depending on the emission intensity measured by the sensor of emission intensity and optionally also depending on the oscillation frequency measured by the sensor of oscillation frequency.

For the implementation of the burner in the process according to the invention: (i) the at least one fuel injector is fluidically connected to a source of a fuel and (ii) the at least one main oxidant injector, the at least one first perforation and the at least one feed of auxiliary oxidant, are fluidically connected to an oxidant source.

The fuel of this source is advantageously chosen from natural gas, biogas, propane, butane, the residual gases of steel-making or methane-reforming processes, hydrogen or any source of a mixture of at least two of these gaseous fuels. The oxidant source is preferably a source of an oxidant having an oxygen content of 21 to 100 vol %, preferably of at least 80 vol %, or even more preferably of at least 90 vol %.

The present invention also relates to an installation comprising a plurality of burners according to the invention.

At least two of said burners, or even all of the burners, of the installation may advantageously have a control system, such as described above, in common. In this case, the common control system controls the adjusting system of each of said at least two burners.

The present invention also relates to a furnace equipped with at least one and preferably a plurality of burners according to the invention for combusting a fuel with an oxidant inside a combustion zone of the furnace, or even of a furnace equipped with an installation according to the invention for combusting a fuel with an oxidant inside a combustion zone of the furnace, the invention being particularly advantageous for furnaces chosen among furnaces for melting glass or enamel, or for melting at least one metal among aluminium, iron, steel, copper and zinc, reheat furnaces, drying furnaces and reforming furnaces. By virtue of the presence of one or more burners according to the invention in this furnace, it is possible, for a given power delivered by a burner, for the flame to produce a relatively oxidizing effect or a relatively reducing effect, in particular on a feedstock located below the flame.

In addition, when the furnace comprises a plurality of burners according to the present invention, this allows the flame of each burner to independently produce a relatively oxidizing effect or a relatively reducing effect, for example depending on the position of the burner in the furnace.

The invention thus allows, for example in a melting/fining furnace for the production of fined glass, the oxidizing effect of the flames on the feedstock in the upstream melting zone to be adjusted and the reducing effect of the flames on the feedstock in the downstream fining zone to also be adjusted, for example in order to limit the formation of foam.

Analogously, in a melting or melting/fining furnace for producing glass in which the colour of the glass is influenced by the redox state of certain ingredients, the present invention allows the redox state of these ingredients in the molten glass to be adjusted in order to obtain glass of the sought-after colour.

BRIEF DESCRIPTION OF THE FIGURES

The present invention and the advantages thereof will be better understood in light of the following examples, reference being made to FIGS. 1 to 4 in which.

DETAILED DESCRIPTION OF THE INVENTION

Figure 1:
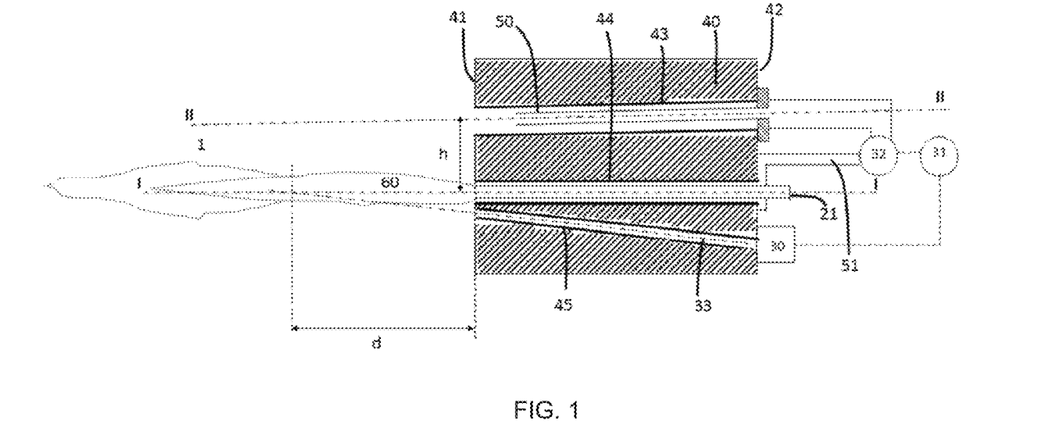
FIG. 1 is a schematic representation in transverse cross section of a first embodiment of a burner according to the invention.

In the embodiment illustrated in FIG. 1, the burner comprises a block 40 made from a refractory material, obtained by cementing, by an electrofusion process or by a pressing process. The refractory material of this block is generally composed of alumina and/or silica and/or zirconia and/or magnesia non-exclusively in proportions suitable for the process into which the block is incorporated, and in particular depending on the temperatures and corrosive species encountered in the process.

The block 40 comprises an entrance face 42 opposite the combustion zone 1 and an exit face 41 on the side of the combustion zone 1 and opposite the entrance face 42.

At least one first perforation 44 extends from the entrance face 42 to the exit face 41. Said at least one first perforation 44 ends at a first level I-I in the exit face 41 of the block 40.

At least one second perforation 43 extends from the entrance face 42 to the exit face 41. This at least one second perforation 43 ends in the exit face 41 at a second level II-II spaced apart from the first level I-I and located above the first level I-I at a distance h from the latter.

At least one fuel injector 21 is positioned in the at least one first perforation 44 of the block 40.

At least one oxidant injector 50 is positioned in the at least one second perforation 43 of the block 40.

The fuel is injected into the combustion zone 1 through the at least one fuel injector 21 in one or more streams.

A main oxidant flow is introduced into the combustion zone 1 in at least one main stream of the oxidant above the one or more streams of the fuel and through the at least one injector 50.

An auxiliary flow of the oxidant is injected through the at least one first perforation 44 about the at least one fuel injector 21. Thus, the auxiliary flow of the oxidant is injected in the combustion zone 1 into contact with the fuel so as to generate an initial flame 60 in the combustion zone 1 by initial partial combustion of the fuel with the auxiliary flow of the oxidant.

Downstream of the initial flame 60, the oxidant of the at least one main stream of the oxidant mixes with fuel that was not consumed by the partial combustion in the initial flame in order to complete the combustion of this fuel. In the present context, the expression "fuel that was not consumed by the partial combustion of the initial flame" is understood to mean both the fuel that was not oxidized in the initial flame and partial-combustion products generated in the initial flame.

A sensor 30 of emission intensity is positioned so that its line of sight 33 is directed toward the initial flame 60. Said sensor 30 allows an emission intensity of the initial flame 60 to be measured.

In the illustrated embodiment, the sensor 30 is fastened to the entrance face 42 of the burner below the first level I-I and at the entrance of an additional perforation 45 the axis of which corresponds to the line of sight 33 of the sensor 30. The line of sight 33 intersects the level I-I (i.e. the plane of the one or more streams of the fuel, or even the axis of one of the first perforations/of one of the fuel injectors) at a distance d from the exit face 41 such that d/h is comprised between 1 and 10.

Depending on the type of sensor, the sensor 30 may also at least partially be mounted inside such an additional perforation.

According to other embodiments, the sensor 30 may be separated from the burner, provided that its position and its line of sight are such that the sensor 30 is able to measure an emission intensity of the initial flame 60 generated by the burner.

The sensor 30 of emission intensity targeting the initial flame is advantageously a UV sensor.

As indicated above, the sensor 30 advantageously measures the emission intensity of the initial flame in an interval of 190 to 520 nm, or preferably in an interval of 280 to 410 nm, or even more preferably in an interval between 300 and 315 nm. The objective is to measure the emission intensity at the emission wavelength of the OH* radical, which is centred on 307 nm+/−5 nm.

The sensor 30 generates a signal corresponding to the measured flame intensity and this signal is transmitted to a control system 31.

The control system 31 is connected to an adjusting system 32 that adjusts the flow rate of the main flow of the oxidant that is injected into the combustion zone 1 by means of the one or more injectors 50 and the flow rate of the auxiliary flow of oxidant 51 that is injected into the combustion zone through the one or more first perforations 44 about the one or more fuel injectors 21. The adjustment of flow rate by the adjusting system 32 may in particular be achieved by means of one or more valves (not illustrated) the openness of which the adjusting system 32 adjusts. It will be noted that by adjusting both the flow rate of the main flow of the oxidant and the flow rate of the auxiliary flow of the oxidant 51, the adjusting system 32 also adjusts the ratio between the flow rate of the main flow of the oxidant and the flow rate of the auxiliary flow of the oxidant 51.

The control system 31 controls the adjusting system 32 so that the latter adjusts the flow rate of the main flow of the oxidant, or the ratio between the flow rate of the main flow of the oxidant and the flow rate of the auxiliary flow of the oxidant 51 depending on the measured emission intensity of the initial flame 60, and optionally the measured oscillation frequency.

Specifically, for example, the higher the emission intensity related to the presence of OH* radicals, the more oxidizing the initial flame 60. Thus, when this emission intensity measured by the sensor 30 indicates an initial flame 60 that is too reducing or not oxidizing enough for the feedstock, the control system 31 emits a signal to the adjusting system 32 to make the latter direct a higher flow rate of the oxidant to the at least one first perforation 44, thus decreasing the ratio between the flow rate of the main flow of the oxidant and the flow rate of the auxiliary flow of the oxidant 51 and making the initial flame less reducing or more oxidizing. In contrast, when the emission intensity measured by the sensor 30 indicates an initial flame 60 that is not reducing enough or too oxidizing for the feedstock, the control system 31 emits a signal to the adjusting system 32 to make the latter direct a smaller portion of the overall flow of oxidant to the at least one first perforation 44, thus increasing the ratio between the flow rate of the main flow of the oxidant and the flow rate of the auxiliary flow of the oxidant 51 and making the initial flame 60 more reducing or less oxidizing.

The present invention thus allows the oxidizing/reducing effect of the initial flame 60 to be adjusted in real-time whatever the power generated by the burner.

According to one embodiment (not illustrated) the second level II-II is located below the first level I-I.

In this case, the present invention allows, in real-time, the oxidizing effect of the one or more streams of the main oxidant, in particular on a feedstock located below the initial flame, and of the one or more streams of the main oxidant to be adjusted, whatever the power generated by the burner.

The sensor 30 of the emission intensity is preferably combined with a sensor that measures the oscillation frequency of the initial flame. Specifically, it has been observed that the emission-intensity and oscillation-frequency signals of the initial flame may be combined to make the measurement of the staggering of the oxidant and the adjustments of the burner such as described above more reliable.

Figure 2:
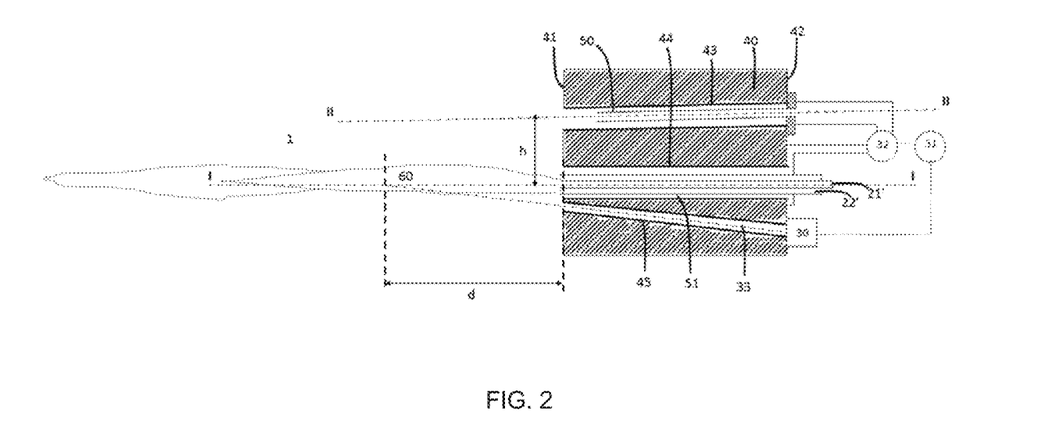
FIG. 2 is a schematic representation in transverse cross section of a second embodiment of a burner according to the invention.

The embodiment illustrated in FIG. 2 differs from the embodiment illustrated in FIG. 1 in that the one or more fuel injectors 21 consist of a pair of two injectors, in particular a pair of a primary injector of the fuel 21' and of a secondary injector of the fuel 22'. In the illustrated embodiment, the primary injector 21' and the secondary injector 22' are concentric, the primary injector 21' being encircled by the secondary injector 22'.

According to this embodiment, the flow of fuel injected into the combustion zone 1 may be injected entirely through the primary injector 21' of the one or more pairs of fuel injectors, entirely through the secondary injector 22' of the one or more pairs of fuel injectors, or even so as to be distributed between the primary injector 21' and the secondary injector 22' of the one or more pairs of fuel injectors.

In this embodiment it is moreover advantageous to guarantee that at least 1% and preferably 5% of the flow of fuel injected by the pair is injected through the secondary injector 22' encircling the primary injector 21'.

As described in more detail in the aforementioned coexisting European patent application 18306820.4, when the fuel is a gaseous fuel, the burner according to such an embodiment advantageously comprises an assembly for injecting the fuel (not illustrated) having the following features:
  a chamber having an inlet through which the overall flow of the fuel is introduced into the assembly,
  the one or more pairs forming the injectors of the fuel are fluidically connected to the chamber so as to be able to receive the fuel that was introduced into the chamber via the fuel inlet, and
  a pressure sensor for detecting a gas pressure in the chamber, located between the fuel inlet and the one or more pairs of injectors.

The burner also comprises an adjusting system for adjusting the distribution of the fuel between the primary injector 21' and the secondary injector 22' of each fuel injector. Advantageously, the control system 31 is then connected to the pressure sensor and to the adjusting system in order to be able to adjust the distribution of the fuel. The control system 31 also controls the latter adjusting system so that the distribution of the fuel between the primary injector 21' and the secondary injector 22' of each pair is adjusted depending on the gas pressure detected by the pressure sensor of the assembly. Advantageously, the control system 31 is then able or programmed to control the adjusting system 32 so that the gas pressure in the chamber is located in a preset pressure zone/range, or even so that this gas pressure corresponds to a preset value.

According to one particularly practical embodiment, the adjusting system 32 adjusts the distribution of the fuel between the primary injector 21' and the secondary injector 22' of each pair by adjusting the cross-sectional flow area of the at least one secondary passage connecting the at least one secondary injector 22' to the upstream chamber.

Such an embodiment, which is perfectly compatible with the present invention, in particular allows the length of the flame generated by the burner to be adjusted.

Figure 3:
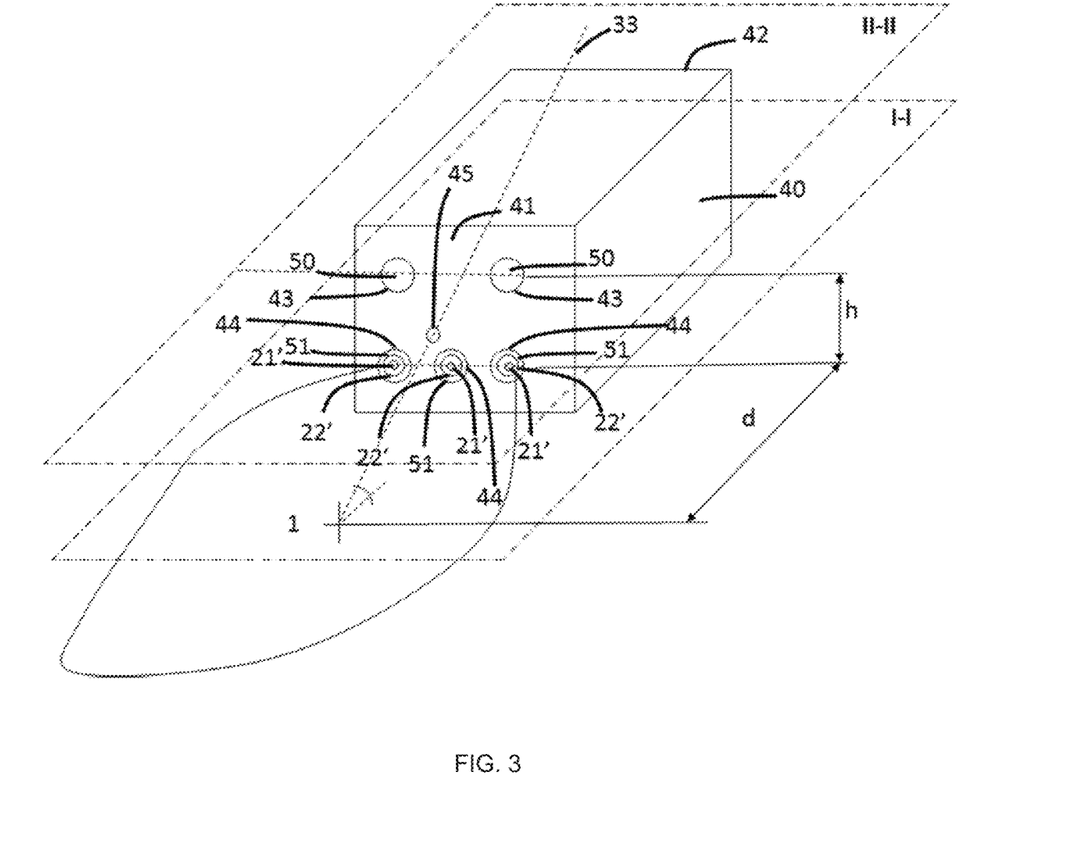
FIG. 3 is a schematic representation of a perspective view of a third embodiment of a burner according to the invention.

As illustrated in FIG. 3, the block 40 of the burner may comprise a plurality of first perforations 44 and a plurality of second perforations 43 that extend between the entrance face 42 and the exit face 41.

In the illustrated embodiment, the burner comprises three first perforations 44 and two second perforations 43. The second perforations 43 end in the exit face 41 at a second level II-II located above the first level I-I at which the first perforations 44 end in this exit face 41.

This geometry allows a flat flame to be generated.

Also according to the illustrated embodiment, the line of sight 33 of the UV/visible sensor 30 passes through an additional perforation 45 and exits from the exit face 41 of the block 40 between the first level I-I and the second level II-II (and not on the side of the first level I-I opposite the second level II-II, as is the case in FIGS. 1 and 2).

Although FIG. 3 shows an embodiment in which the fuel injectors 21 are pairs formed from a primary fuel injector 21' and a secondary fuel injector 22', such a configuration (in particular as regards the number and position of the various perforations 43 and 44 and the position and orientation of the line of sight 33) is also usable for embodiments of the present invention in which the fuel injectors 21 (each) define a single passage for injection of fuel.

Figure 4:
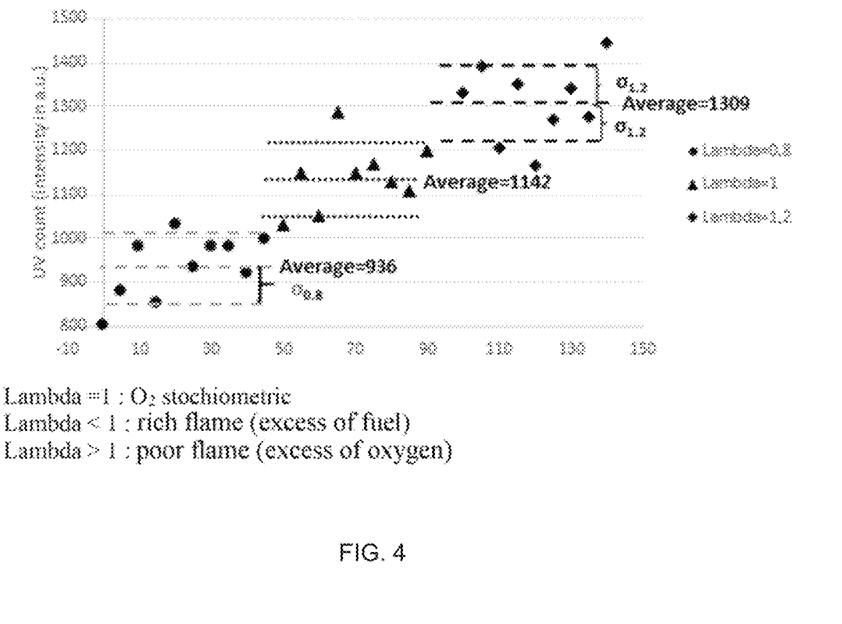
FIG. 4 is a graph showing the emission intensity of the initial flame as a function of the richness of this initial flame measured with a sensor having a sensitivity peak at 310 nm.

As illustrated in FIG. 4, it has been observed that the average of the emission-intensity signal (average over a few seconds) of the initial flame is higher when the initial flame is poor in fuel, comparatively to a lower UV-signal average when the initial flame is rich in fuel. Thus, a high UV intensity is characteristic of an initial flame that is poor in fuel, and shorter, and therefore of a relatively oxidizing atmosphere above the feedstock, in the configuration in which the fuel injector is positioned below the main oxidant injection. Thus, a relatively lower UV intensity is characteristic of an initial flame that is rich in fuel, and longer, and therefore of a relatively reducing atmosphere above the feedstock, in the employed configuration in which the fuel injection is positioned below the main oxidant injection. It will also be noted that the differentiation is also possible, or even better, with the combination of the flame-intensity signals and of the flame-oscillation-frequency signals.

The measurements of the sensor may therefore be used to adjust the distribution of oxidant between the auxiliary injections in the main injections of oxidant. A valve allows the distribution of fluid between the auxiliary injections and the main injections of oxidant to be controlled, and the position of this valve is controlled depending on the information delivered by the sensor. These adjustments may be automatic, and may advantageously be made in various combusting processes such as the production of glass or metals.

Examples of Implementation

The colour and fining quality of glass are controlled by a multitude of factors such as the amount of reducing agent (carbon, iron oxide, sulfide) or oxidizing agent (sulphate, nitrate, antimonate, etc.) or fining agent, the concentration of water in the gaseous atmosphere of the furnace, the temperature of the bath, etc. and in particular the amount of oxidizing gaseous species ($O_2$) or reducing gaseous species (CO) that are generated in the flames of the burners and make contact with the surface of the glass. However, the nonlinearity and complexity of the relations between these factors and the redox state and colour of the glass therefore limit the quantitative comprehension thereof. The implementation of combustion technology allowing the redox state of the gaseous atmosphere above the glass bath (i.e. below the flame) thus makes flexibility in the control of the colour and quality of the glass possible.

One embodiment of the invention described above may therefore advantageously be used to control the staggering of the oxidant between the main injection and the auxiliary injection in order to control the concentration of CO and $O_2$ around the initial flame and it particular above the glass bath. In the case of first perforations below second perforations, the more the combustion is staggered (low flow rate of auxiliary oxidant) the more reducing the gaseous atmosphere above the glass bath will be, this typically being desirable in the fining zone. Conversely, the less the combustion is staggered (low flow rate of main oxidant) the more oxidizing the gaseous atmosphere above the glass bath will be, this typically being desirable in the loading zone.

The integration of a sensor of emitted intensity capable of quantifying the staggering of the flame through local richness thus makes it possible to quantitatively control the redox state of the gaseous atmosphere around the initial flame and in particular above the glass bath without necessarily modifying the total oxidant flow rate of the burner.

This adjustment may also have an advantageous application in furnaces for melting or recycling non-ferrous metals in which it is essential to keep a reducing gaseous atmosphere above the molten metal in order to prevent oxidation of said metal and losses of metal yield. However, to maintain this reducing gaseous atmosphere throughout the duration of the cycle is undesirable because such a combustion is less efficient, and liable to produce unburnt materials that will affect emissions and the smoke circuits (clogging of filters, deposits, etc.). Thus, the burner will be required to operate in a relatively oxidizing operating mode during the loading phase and the phase in which melting starts, and in a relatively reducing operating mode during the homogenization and fining phases.

This adjustment may prove to be useful to limit emissions of nitrous oxides (NOx). Specifically, it is known to those skilled in the art that a reducing atmosphere (presence of CO) allows NOx to be reduced and thus the quantity thereof transmitted to the chimney to be limited.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise. "Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:
1. A process for combusting a fuel with main and auxiliary flows of oxidant in a combustion zone using a burner upstream of the combustion zone, the burner comprising: a block with an exit face facing the combustion zone and an entrance face opposite the exit face, said block comprising at least one first perforation that extends from the entrance face to the exit face which ends at a first level in the exit face, and at least one second perforation that extends from the entrance face to the exit face which ends in the exit face at a second level that is spaced apart from the first level and located below or above the first level; at least one fuel injector positioned in the at least one first perforation; and at least one main oxidant injector positioned at least one of which is in the at least one second perforation, said process comprising the steps of:
injecting at least one stream of the fuel into the combustion zone through the at least one fuel injector and the at least one first perforation;
introducing at least one main stream of the main flow of oxidant into the combustion zone below or above the at least one stream of the fuel and through the at least one main oxidant injector and the at least one second perforation;
introducing the auxiliary flow of oxidant into the combustion zone and into contact with the at least one fuel stream thereby generating an initial flame in which the at least one main stream of the fuel is partially combusted with the auxiliary flow in the combustion zone and in which non-consumed fuel that was not combusted in the initial flame with the auxiliary flow is yielded;

downstream of the initial flame, mixing the at least one main stream of the main flow of oxidant with the non-consumed fuel thereby completing combustion of the at least one main stream of the fuel downstream of the initial flame;

measuring an emission intensity of the initial flame;

adjusting a flow rate of the main flow of the oxidant, depending on the measured emission intensity so that the emission intensity of the initial flame is located in a preset zone or range of emission intensity;

measuring an oscillation frequency of the initial flame; and adjusting a ratio between the flow rate of the main flow of the oxidant and a flow rate of the auxiliary flow of the oxidant, depending on the measured oscillation frequency.

2. The process of claim 1, wherein the at least one first perforation comprises a plurality of first perforations.

3. The process of claim 1, wherein the at least one fuel injector comprises a plurality of fuel injectors each of which is positioned in an associated one of the plurality of first perforations.

4. The process of claim 3, wherein the at least one second perforation comprises a plurality of second perforations and the at least one main oxidant injector comprises a plurality of main oxidant injectors each of which is positioned in an associated one of the plurality of second perforations.

5. The process of claim 1, wherein the at least one second perforation comprises a plurality of second perforations.

6. The process of claim 1, wherein the at least one main oxidant injector comprises a plurality of main oxidant injectors each of which is positioned in an associated one of the plurality of second perforations.

7. The process of claim 1, wherein the auxiliary flow of the oxidant is introduced into the combustion zone through the at least one first perforation.

8. The process of claim 1, wherein the measured emission intensity is measured with an emission intensity sensor directed towards the initial flame in an interval of 190 to 520 nm.

9. The process of claim 1, wherein the flow rate of the main flow is adjusted so that the emission intensity of the initial flame is located in a preset range.

10. The process of claim 1, wherein the ratio between the flow rate of the main flow and the flow rate of the auxiliary flow is adjusted so that the measured emission intensity is located in a present range.

11. The process of claim 1, wherein the measured oscillation frequency is measured with an oscillation frequency sensor directed towards the initial flame.

12. The process of claim 1, wherein the flow rate of the main flow is adjusted so that the measured emission intensity of the initial flame is located in a preset range.

13. The process of claim 1, wherein the flow rate of the main flow is adjusted so that each of the measured emission intensity and the measured oscillation is located in a preset range.

14. The process of claim 1, wherein the ratio between the flow rate of the main flow and the flow rate of the auxiliary flow is adjusted so that the measured emission intensity of the initial flame is located in a preset range.

15. The process of claim 1, wherein the ratio of the flow rate of the main flow and the flow rate of the auxiliary flow is adjusted so that each of the measured emission intensity and the measured oscillation is located in a preset range.

16. The process of claim 1, wherein the flow rate of the main flow is adjusted so that the product of the measured emission intensity and the measured oscillation frequency is located within a preset range.

17. The process of claim 1, wherein the ratio of the flow rate of the main flow and the flow rate of the auxiliary flow is adjusted so that the product of the measured emission intensity and the measured oscillation frequency is located within a preset range.

18. The process of claim 1, wherein:
the at least one main oxidant injector comprises at least two main oxidant injectors positioned in the at least one second perforation of the block;
the at least one main stream of the main flow comprises at least two main streams of the main flow;
the at least one fuel injector comprises at least two fuel injectors positioned in the at least one first perforation;
the at least one stream of the fuel comprises at least two streams of the fuel;
the at least two streams of the fuel are injected into the combustion zone through the at least two fuel injectors and the at least one first perforation;
the at least two main streams of the main flow are injected into the combustion zone below or above the at least two streams of the fuel; and
each of the at least two main streams of the main flow are injected through an associated one of the at least two injectors of the main oxidant and the at least one second perforation.

19. The process of claim 1, wherein the measured emission intensity and optionally the measured oscillation frequency is transmitted to a control system, said control system being connected to an adjusting system that adjusts the flow rate of the main flow or the ratio between the flow rate of the main flow and the flow rate of the auxiliary flow, said control system controlling the adjusting system so that the flow rate of the main flow or the ratio between the flow rate of the main flow and the flow rate of the auxiliary flow is adjusted depending on the measured emission intensity and optionally the measured oscillation frequency.

\* \* \* \* \*